Sept. 2, 1969  W. H. McFARLAND  3,465,338
SYSTEM FOR SYNCHRONIZING A PLURALITY OF TRANSMITTERS
Filed May 15, 1968  2 Sheets-Sheet 2

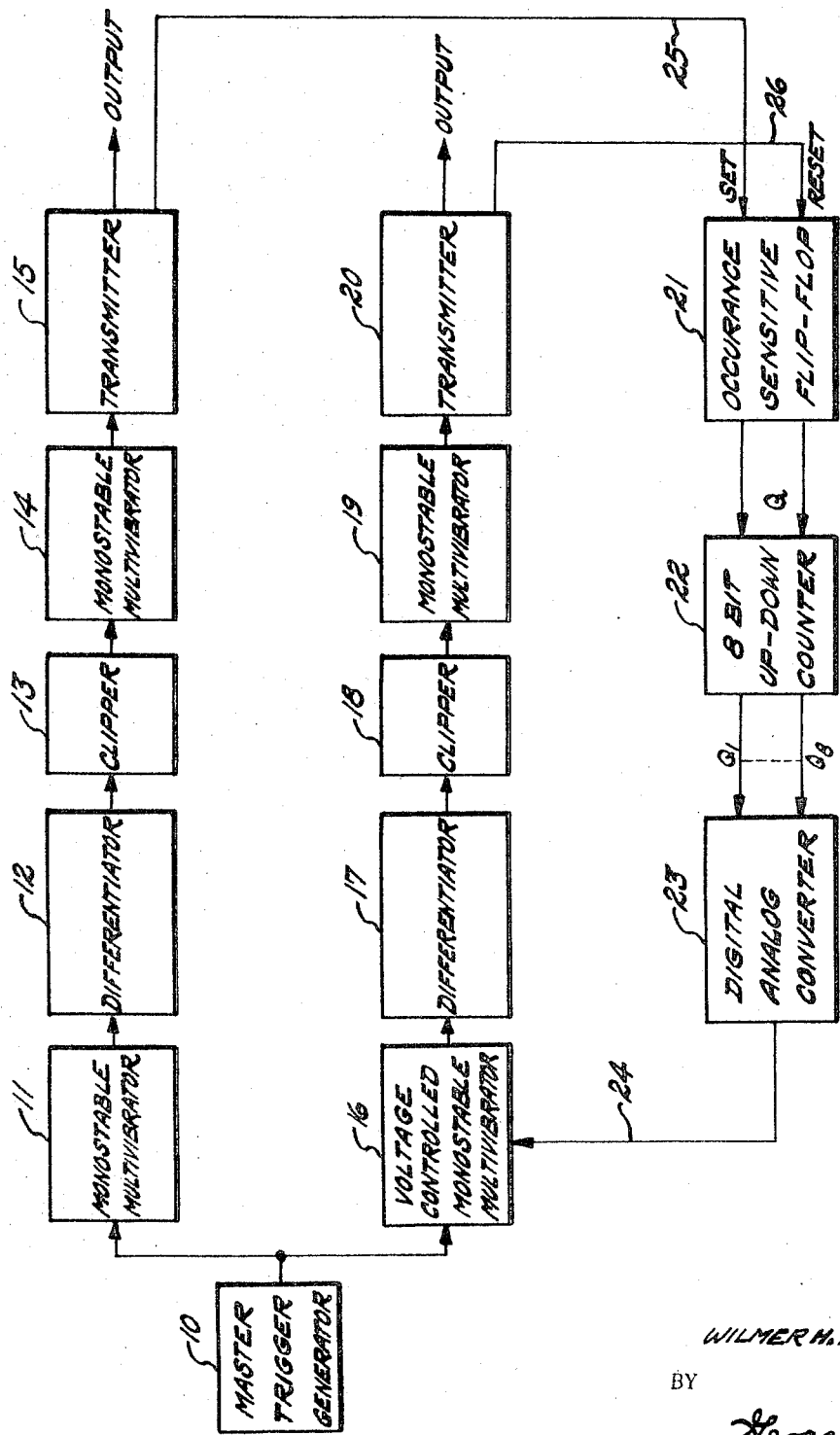

PRE TRIGGER PULSE FROM MASTER TRIGGER GENERATOR 10

PULSE OUTPUT OF MULTIVIBRATOR 11

PULSE OUTPUT OF DIFFERENTIATOR 12

PULSE OUTPUT OF CLIPPER 13

PULSE OUTPUT OF MULTIVIBRATOR 14

PULSE OUTPUT OF MULTIVIBRATOR 16

PULSE OUTPUT OF DIFFERENTIATOR 17

PULSE OUTPUT OF CLIPPER 18

PULSE OUTPUT OF MULTIVIBRATOR 19

DIFFERENCE IN DELAY THROUGH THE TRANSMITTERS AND ASSOCIATED MODULATORS

Fig. 2

INVENTOR
WILMER H. MCFARLAND
BY
George Fine
ATTORNEY under# United States Patent Office 3,465,338
Patented Sept. 2, 1969

3,465,338
SYSTEM FOR SYNCHRONIZING A PLURALITY OF TRANSMITTERS
Wilmer H. McFarland, Fullerton, Calif., assignor to the United States of America as represented by the Secretary of the Air Force
Filed May 15, 1968, Ser. No. 729,328
Int. Cl. G01s 9/06; H04b 7/00
U.S. Cl. 343—17.1                                    4 Claims

ABSTRACT OF THE DISCLOSURE

Apparatus to synchronize the firing of a plurality of transmitters utilizing an initial single trigger which activates simultaneously a serial arranged first pair of monostable multivibrators and a serial arranged second pair of monostable multivibrators. The pulse width of the first monostable multivibrators of the second pair is varied as a function of the difference in delays in firing the first and second transmitters. The trailing edges of the pulse outputs of the first multivibrators of the first and second pair initiate pulses for firing the first and second transmitters, respectively.

Background of the invention

The present invention relates to a radar system, and more particularly to a radar system including a plurality of transmitters whose firing is synchronized by determining the initial delay in firing between the transmitters and utilizing the delay for synchronization of the transmitters.

The mechanization of certain radar systems including a plurality of transmitters has necessitated that a number of transmitters fire within 50 nanoseconds of each other. The delays through the associated modulators controlling the transmitters can vary by several microseconds and the delays also vary as a function of temperature. This variable delay precluded in the past the possibility of firing the transmitters from a common source.

Summary of the invention

A master trigger generator associated with a radar system provides a pulse for triggering simultaneously a monostable multivibrator and a voltage controlled monostable multivibrator. The pulse width of the voltage controlled monostable multivibrator is varied as a function of the difference in delays through the modulators and transmitters of aforesaid radar system. The trailing edge of each of the outputs of the multivibrators are utilized to provide the actual triggers to each of the transmitters.

An object of the present invention is to provide a system for synchronizing multiple transmitters included in a radar system.

Another object of the present invention is to provide a system for synchronizing a plurality of radar transmitters in accordance with the difference in delay through the transmitters and their associated modulators.

In the accompanying specification, I shall describe, and in the annexed drawings show, what is at present considered a preferred embodiment of my present invention. It is, however, to be clearly understood that I do not wish to be limited to the exact details shown and described as they are for the purposes of illustration only, inasmuch as changes therein may be made without the exercise of invention and within the true spirit and scope of the claims hereto appended.

Description of the drawings

FIGURE 1 shows a block diagram of the preferred embodiment of the invention; and FIGURE 2 illustrates the timing diagram associated with FIGURE 1.

Description of the preferred embodiment

Now referring in detail to FIGURE 1, there is shown a conventional master trigger generator 10 which is included in a multiple transmitter radar system. Master trigger generator 10 provides a pre-trigger pulse (as indicated by waveform in timing diagram of FIGURE 2) which is applied simultaneously to monostable multivibrator 11 and voltage controlled monostable multivibrator.

In response to the pre-trigger (master) pulse, monostable multivibrator 11 and voltage controlled monostable multivibrator 17 simultaneously provide output pulses whose leading edges coincide with the leading edge of the pre-trigger pulse as indicated by the waveform in FIGURE 2. However, it is noted that voltage controlled monostable multivibrator 16 receives an additional input from line 24 in the form of a voltage control pulse for the purpose of controlling the position of the trailing edge of its output pulse and thereby providing an output pulse of variable width. Voltage controlled monostable multivibrator 16 is of a conventional type such as shown and described in Air Force Manual 52–8, pages 6–73 to 6–75, published June 30, 1951, and also known as a start-stop monostable multivibrator.

The output pulses from monostable multivibrator 11 and voltage controlled monostable multivibrator 16 are differentiated and clipped by differentiators 12 and 17, and clippers 13 and 18, respectively, to provide pulses representative of the trailing edges of the output pulses from multivibrators 11 and 16, respectively, as indicated by waveforms in FIGURE 2. These representative pulses are utilized to activate monostable multivibrators 14 and 19 to provide transmitter trigger pulses therefrom to fire transmitters 15 and 20, respectively, also as indicated by waveforms in FIGURE 2. Transmitters 15 and 20 are the conventional pulsed type transmitters utilized in radar systems and included in these components are magnetrons and their associated modulators.

Magnetron current pulses from transmitters 15 and 20 are delivered to occurrence sensitive flip-flop 21 by way of set-reset lines 25 and 26, respectively. These current pulses represent the actual time of firing of the transmitters. The last pulse to occur controls the state of the Q output of conventional occurrence sensitive flip-flop 21 and this indicates which transmitter fired last. Occurrence sensitive flip-flop 22 may be such as shown and described at pages 81–95 of, "Digital Computer Fundamentals," by T. C. Bartee, published by McGraw-Hill in 1960. The Q output serves an up-down control on conventional 8 bit up-down counter 22 which adds or subtracts one count each PRF (pulse repetition frequency). The outputs $Q_1$–$Q_8$, of 8 bit updown counter 22 are fed to conventional digital to analog converter 23 which in turn is used to control the pulse width of voltage controlled monostable multivibrator 16 and consequently the time of firing transmitter 20 is controlled as a function of the delays of the transmitters and associated modulators as indicated in FIGURE 2.

It is noted that the foregoing description relates to synchronizing two transmitters but any desired number of transmitters may be controlled by identical loops.

It is emphasized that the pulse width of voltage controlled monostable multivibrator 16 was varied as a function of the difference in delays through transmitters 15 and 20 and associated modulators. The trailing edge of the output pulses from monostable multivibrator 11 and voltage controled monostable multivibrator 16 provided the trigger to transmitters 15 and 21, respectively.

While in accordance with the provisions of the statutes, I have illustrated and described the best form of the invention now known to me, it will be apparent to those skilled in the art that changes may be made in the form of the system disclosed without departing from the spirit of the invention as set forth in the appended claims, and that in some cases certain features of the invention may be used to advantage without a corresponding use of other features.

Having now described my invention, what I claim as new and desire to secure by Letters Patent, is as follows:

1. A system for synchronizing a plurality of transmitters associated with a single radar comprising means to generate a master trigger, said master trigger generating means associated with said radar, first pulse generating means having a single input and output, said input receiving said master trigger and said output being a first pulse of fixed width whose leading edge coincides with the leading edge of said received master trigger, second pulse generating means having first and second inputs and an output, said first input of said second pulse generating means receiving said master trigger simultaneously with said input of said first pulse generating means, said output of said second pulse generating means being a second pulse of variable width whose leading edge also coincides with the leading edge of said master trigger, said second input of said second pulse generating means receiving a control pulse determining said variable width, first means to generate a first transmitter trigger pulse representative of the trailing edge of said first pulse, second means to generate a second transmitter trigger pulse representative of the trailing edge of said second pulse, first and second pulse transmitters associated with said radar being triggered by said first and second transmitter trigger pulses, respectively, to provide output pulses therefrom, means to measure the delay between the output pulses from said first and second pulse transmitters to provide a signal representative of said delay, and means to generate a control pulse from said representative signal delay, said control pulse being received by said second input of said second pulse generating means.

2. A system for synchronizing a plurality of transmitters as described in claim 1 wherein said first pulse generating means and said second pulse generating means consists of a monostable multivibrator and stop-start voltage controlled monostable multivibrator, respectively.

3. A system for synchronizing a plurality of transmitters as described in claim 1 wherein said first means to generate said first transmitter trigger pulse is comprised of a first differentiator receiving said first pulse, a first clipper receiving the output of said first differentiator permitting the passage only of a pulse representative of the leading edge of said first output pulse, a third monostable multivibrator receiving the output of said first clipper and providing as an output in response thereto said first transmitter trigger pulse.

4. A system for synchronizing a plurality of transmitters as described in claim 3 wherein the means to generate said second transmitter trigger pulse is comprised of a second differentiator receiving said second pulse, a clipper receiving the output of said second differentiator and permitting the passage only of a pulse representative of the trailing edge of said second pulse, a fourth monostable multivibrator receiving the output of said second clipper and providing as an output in response thereto said second transmitter trigger pulse.

References Cited

UNITED STATES PATENTS

| 3,149,331 | 9/1964 | Kime | 343—17.1 |
| 3,162,853 | 12/1964 | Bradsell | 343—17.1 |
| 3,298,025 | 1/1967 | Fumea | 343—17.1 |

RODNEY D. BENNETT, Jr., Primary Examiner

H. C. WAMSLEY, Assistant Examiner